United States Patent
Nanba et al.

(10) Patent No.: US 6,781,938 B2
(45) Date of Patent: Aug. 24, 2004

(54) EXPECTED VALUE GENERATION UNIT AND A DATA REPRODUCTION APPARATUS

(75) Inventors: Akira Nanba, Kato (JP); Kenichi Hamada, Kato (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 10/115,989

(22) Filed: Apr. 5, 2002

(65) Prior Publication Data

US 2003/0112733 A1 Jun. 19, 2003

(30) Foreign Application Priority Data

Dec. 17, 2001 (JP) ......................................... 2001-383714

(51) Int. Cl.[7] ............................................... G11B 5/09
(52) U.S. Cl. ................................. 369/59.22; 369/59.21; 369/124.05
(58) Field of Search ........................... 369/59.21, 59.22, 369/124.05, 124.07, 124.1, 124.11, 124.12, 47.18, 47.19, 53.35, 53.36

(56) References Cited

U.S. PATENT DOCUMENTS

| | | | | |
|---|---|---|---|---|
| 5,508,993 A | * | 4/1996 | Hayashi et al. | 369/59.22 |
| 5,517,476 A | * | 5/1996 | Hayashi | 369/59.22 |
| 5,661,709 A | * | 8/1997 | Takagi et al. | 369/59.22 |
| 6,603,722 B1 | * | 8/2003 | Taguchi et al. | 369/59.21 |
| 6,671,112 B2 | * | 12/2003 | Murakami et al. | 360/39 |
| 6,674,707 B2 | * | 1/2004 | Ogura et al. | 369/59.22 |

FOREIGN PATENT DOCUMENTS

JP 11-330986 11/1999

* cited by examiner

Primary Examiner—Thang V. Tran
(74) Attorney, Agent, or Firm—Staas & Halsey LLP

(57) ABSTRACT

A data reproduction apparatus that employs an expected value generation unit that employs a maximum likelihood decoding algorithm, thereby an expected value is correctly determined from a histogram of sampled values of a signal to be reproduced, even when an offset arises in the signal to be reproduced, the offset being removed from the sampled values used in generating a histogram that is used to determine the expected value.

4 Claims, 9 Drawing Sheets

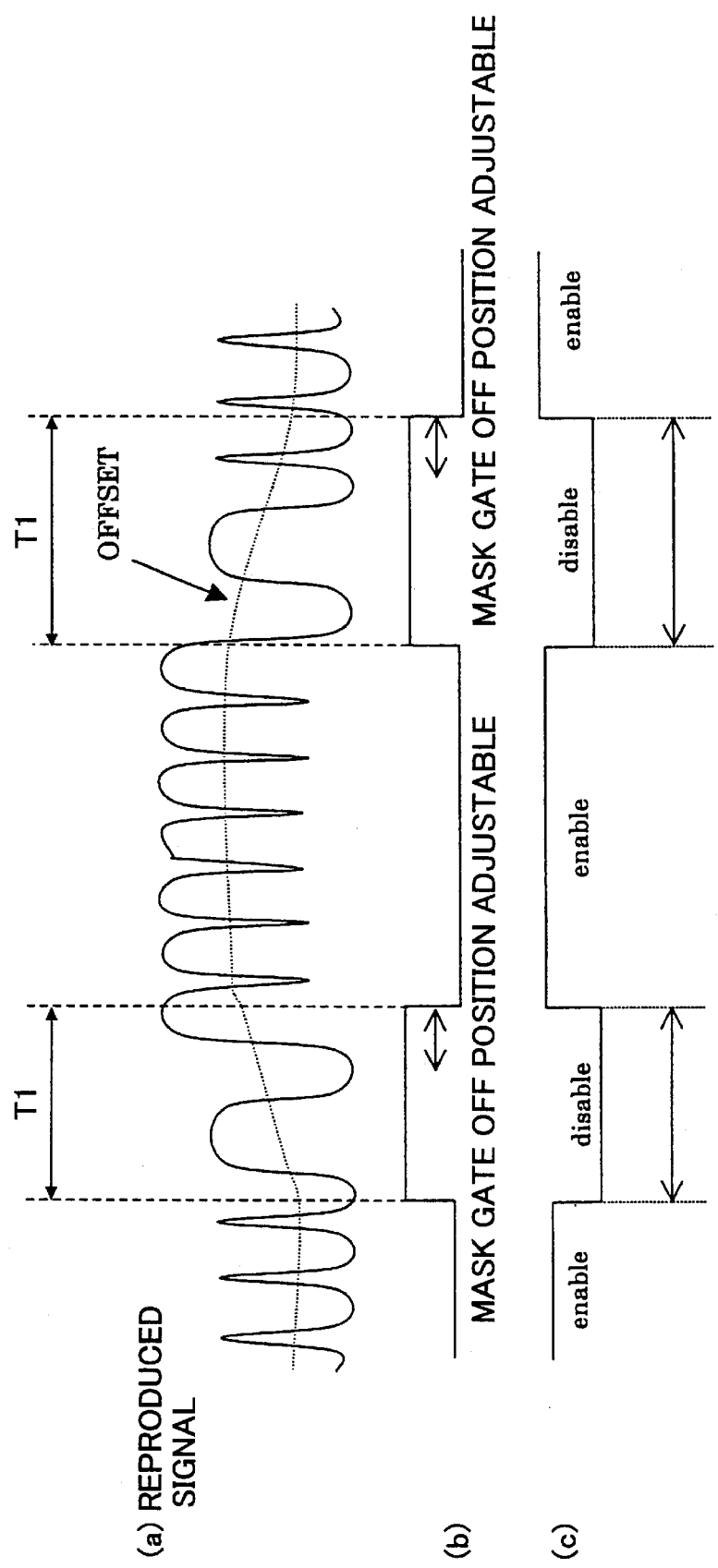

EXPECTED VALUE GENERATION UNIT AND A DATA REPRODUCTION APPARATUS

BACKGROUND OF THE INVENTION

1. Field of the Invention

The present invention generally relates to an expected value generation unit used by a data reproduction apparatus, such as an optical disk apparatus and a magnetic disk apparatus, and specifically relates to the expected value generation unit that generates an expected value used when reproducing data according to maximum likelihood decoding algorithms, such as a Viterbi decoding algorithm.

Further, the present invention relates to a data reproduction apparatus that performs reproduction of data using the expected value generated by the expected value generation unit.

2. Description of the Related Art

An optical recording medium, such as an optical disk, and an optical magnetic disk, of an optical disk apparatus is widely used in various fields, such as an auxiliary memory unit of a computer, due to large capacity, portability, high reliability, and so on. As for an optical disk apparatus, recording and reproduction of data with a higher precision are required as the recording density is increasing.

As for recording and reproducing data with a high precision with the optical disk recording medium, a PRML technique has been proposed, wherein data modulation recording corresponding to partial-response (PR) wave is performed, and reproducing most probable data are performed, employing a maximum likelihood decoding (ML) using sampled values obtained by sampling a signal to be reproduced at a predetermined sampling frequency, the signal being read from the optical disk recording medium.

An example of a data reproduction apparatus that uses the ML technique in reproducing original signals from the optical disk recording medium to which data are recorded using the PR technique, is configured as shown in FIG. 1.

As shown in FIG. 1, the data reproduction apparatus includes an optical head 20 that optically scans an magneto optical disk 200 to which data are recorded by the PR technique, reads the data, and outputs a signal of the read data, an amplifier 21, a low pass filter (henceforth LPF) 22, an analog to digital converter (henceforth ADC) 23, a digital equalizer (henceforth EQ) 24, a synchronous clock generation unit 25, and a maximum likelihood decoding unit 100. The signal read from the optical head 20 is supplied to the ADC 23 through the amplifier 21 and the low pass filter 22, as a signal to be reproduced. The ADC 23 samples the signal to be reproduced in synchronization with the synchronous clock supplied from the synchronous clock generation unit 25, and outputs sampled values sequentially. The EQ 24 operates in synchronization with the synchronous clock, and applies waveform equalization processing of a PR wave to the sampled values from the ADC 23.

The sampled values that are waveform-equalized by the EQ 24 are supplied to the maximum likelihood decoding unit 100 sequentially. The maximum likelihood decoding unit 100 includes, for example, a Viterbi decoder, and reproduces most probable data according to the Viterbi decoding (maximum likelihood decoding) algorithm from the sampled values supplied sequentially, and outputs the data sequentially.

The maximum likelihood decoding unit 100 that processes according to the Viterbi decoding algorithm is configured as shown in FIG. 2.

In FIG. 2, the maximum likelihood decoding unit 100 includes a branch metric calculation unit 10 (henceforth, simply called BM), an addition-comparison-selection unit 11 (Add-Compare-Select, henceforth simply ACS), a path metric memory unit 12 (henceforth, PMM), and a path memory unit 13 (henceforth, PM).

The BM 10 calculates a branch metric value (henceforth BM value) based on a difference between a sampled value yt supplied sequentially and an expected value. The expected value is a value based on a partial response wave used when recording, and is the value that a reproduced signal should take. The BM value is calculated for every expected value, when a sampled value yt is supplied to the BM 10.

The ACS 11 adds the BM value of a current clock cycle to a path metric value (henceforth, PM value) of a previous clock cycle, stored in the PMM 12 (Add), and compares every two PM values after the addition (Compare). Then, the ACS 11 selects a smaller value of the two PM values compared, as a new PM value (Select), and stores the selected PM value in the PMM 12. Consequently, the PM value turns into an accumulated sum of BM values through processing such as above. Selecting a certain PM value as mentioned above is equivalent to selecting a path of a state transition. That is, the ACS 11 always selects a path of a state transition the PM value of which is the minimum.

Data (binary data) equivalent to the path selected as mentioned above are supplied to the PM 13 from the ACS 11. The PM 13 shifts the data corresponding to each selected path one by one, and screens data corresponding to paths that are not to be selected, based on continuity of the state transition in the shifting process. Then, the PM 13 outputs data corresponding to surviving paths as detected data.

As mentioned above, the maximum likelihood decoding unit 100 performs the likeliest reproduction of the data, based on the sampled value yt sequentially input and the expected value based on the PR wave. The expected value corresponds to a sampled value that should duly be acquired from the PR wave. If the wave of a signal to be reproduced is correctly in agreement with the PR wave, accurate reproduction of data is possible, even if the expected value is a fixed value. However, if a fixed expected value is used when distortion etc. is present in the signal to be reproduced, accurate reproduction of data are not expectable.

A technique is proposed, whereby an expected value is decided from a distribution state of the sampled values expressed on a histogram. The histogram is generated from the sampled values of the signal to be reproduced. For example, in the case of a PR(11) wave that has three expected values, the histogram of the sampled values of the signal to be reproduced shows three peaks, as shown in FIG. 4 (b). Sampled values corresponding to the three peaks are used as the expected values of the PR(11) wave.

However, if an offset arises in the signal to be reproduced, for example, due to envelope fluctuation, and the like, as shown in FIG. 3, variations in the sampled values become large, and peaks are not clear in the histogram as shown in FIG. 4($a$). For this reason, reliability of the expected value determined from such a histogram is low, and an ability to reproduce correct data declines.

SUMMARY OF THE INVENTION

It is a general object of the present invention to provide an expected value generating unit and a data reproduction apparatus that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the expected value generating unit and the data reproduction apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, a first objective of the present invention is to provide an expected value generating unit that is capable of providing a correct expected value, even if there occurs an offset in the signal to reproduce.

A second objective of the present invention is to provide a data reproduction apparatus that uses the expected value generation unit.

In order to achieve the first objective of the present invention, the expected value generation unit used by the data reproduction apparatus includes an offset detection unit that detects an offset amount of a signal to be reproduced, an offset cancellation unit that removes the offset detected by the offset detection unit from sampled values of the signal to be reproduced, and a histogram generation unit that generates a histogram of the sampled values from which the offset has been removed by the offset cancellation unit. In this manner, the expected value is determined based on the histogram of the sampled values, the histogram being generated by the histogram generation unit.

In the expected value generation unit, if an offset is detected in a signal to be reproduced, the offset is removed from the sampled values of the signal to be reproduced. Then, the histogram of the sampled values from which the offset has been removed is generated, and an expected value is determined from the generated histogram. Thus, since the sampled values from which the offset was removed become close to the sampled value from an original signal, there appear peaks that correspond to the original signal wave, in the histogram generated from the sampled value.

Further, in order to obtain a correct histogram even if an amount of the offset changes suddenly, the expected value generation unit includes a unit that detects a period during which the offset amount is expected to changes suddenly, and a control unit that excludes sampled values during the period.

In the expected value generation unit configured as above, a sudden change of the offset amount, which deteriorates stability of the offset amount detection, is removed from the sampled values from which the histogram is generated.

The second objective of the present invention is achieved by configuring a data reproduction apparatus employing the expected value generation unit mentioned above.

BRIEF DESCRIPTION OF THE DRAWINGS

FIG. 9 is a timing chart showing a mask gate signal when an offset amount of a signal to be reproduced changes suddenly, and an enable signal of a counter.

DESCRIPTION OF THE PREFERRED EMBODIMENTS

Hereafter, embodiments of the present invention are explained using a drawing.

Figure 1:
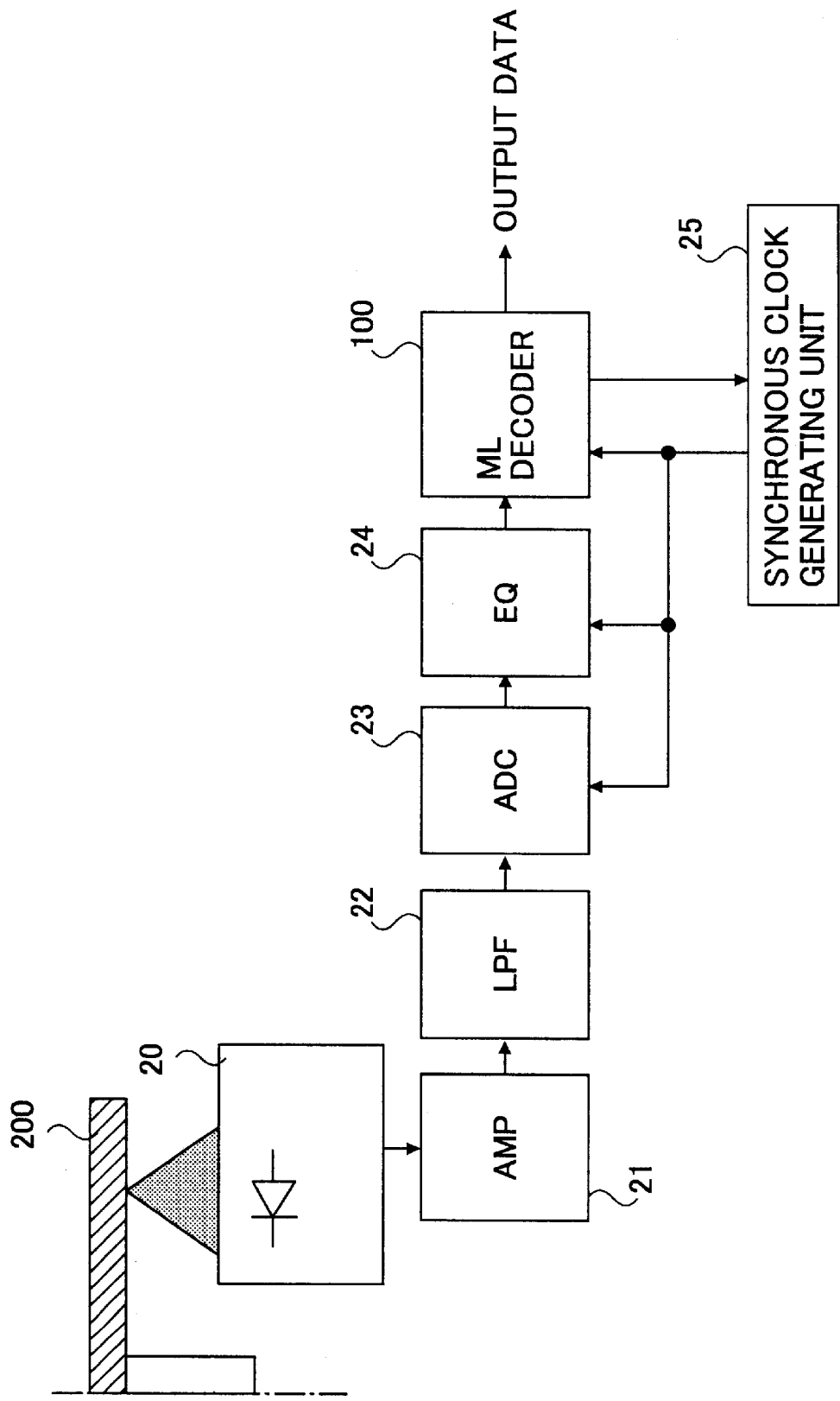
FIG. 1 is a block diagram showing a configuration example of a data reproduction apparatus.
Figure 2:
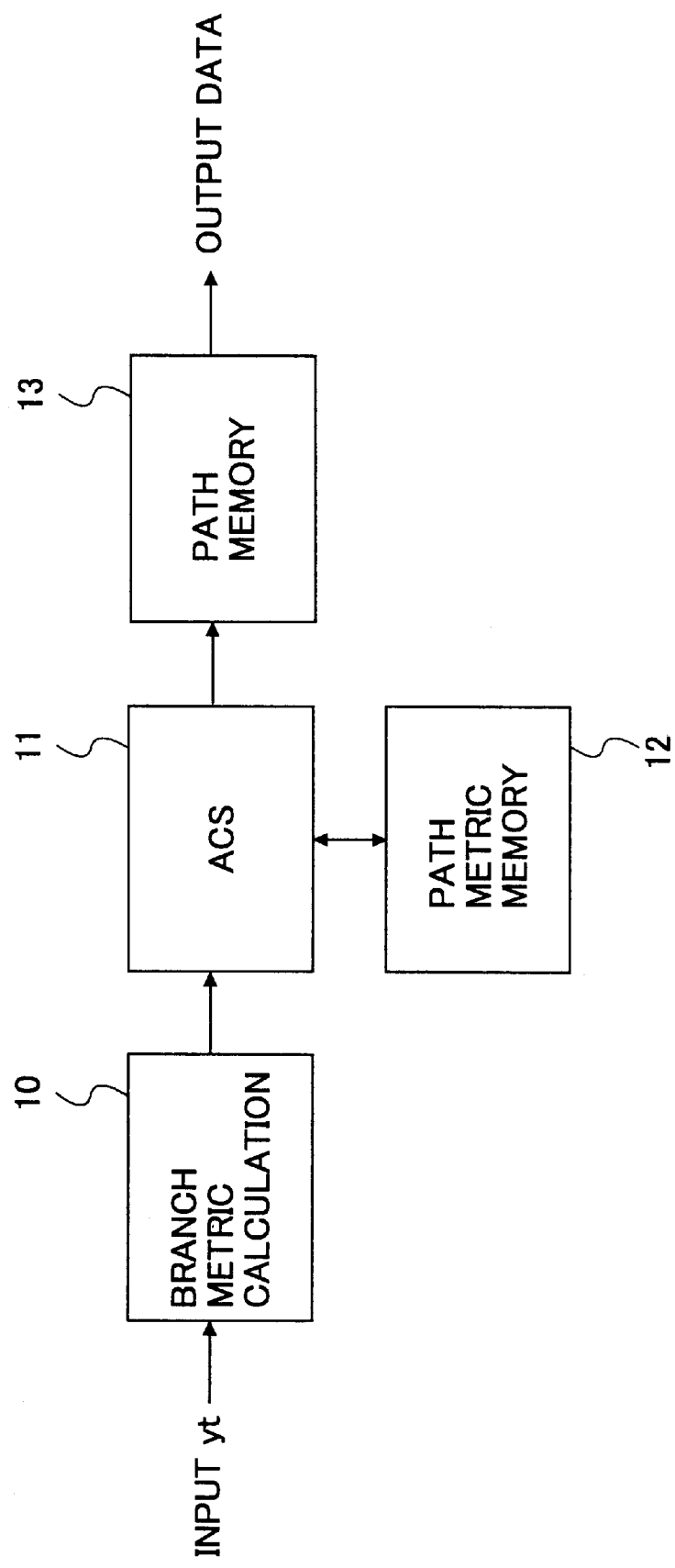
FIG. 2 is a block diagram showing an example of a basic configuration of a maximum likelihood decoding (Viterbi decoding) unit.
Figure 3:
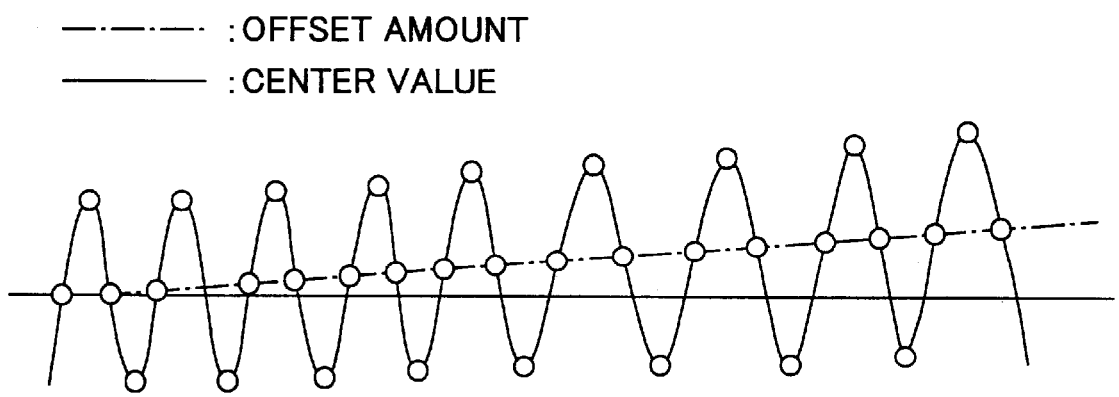
FIG. 3 is a figure showing a state where a signal to be reproduced in a data reproduction apparatus contains an offset.
Figure 5:
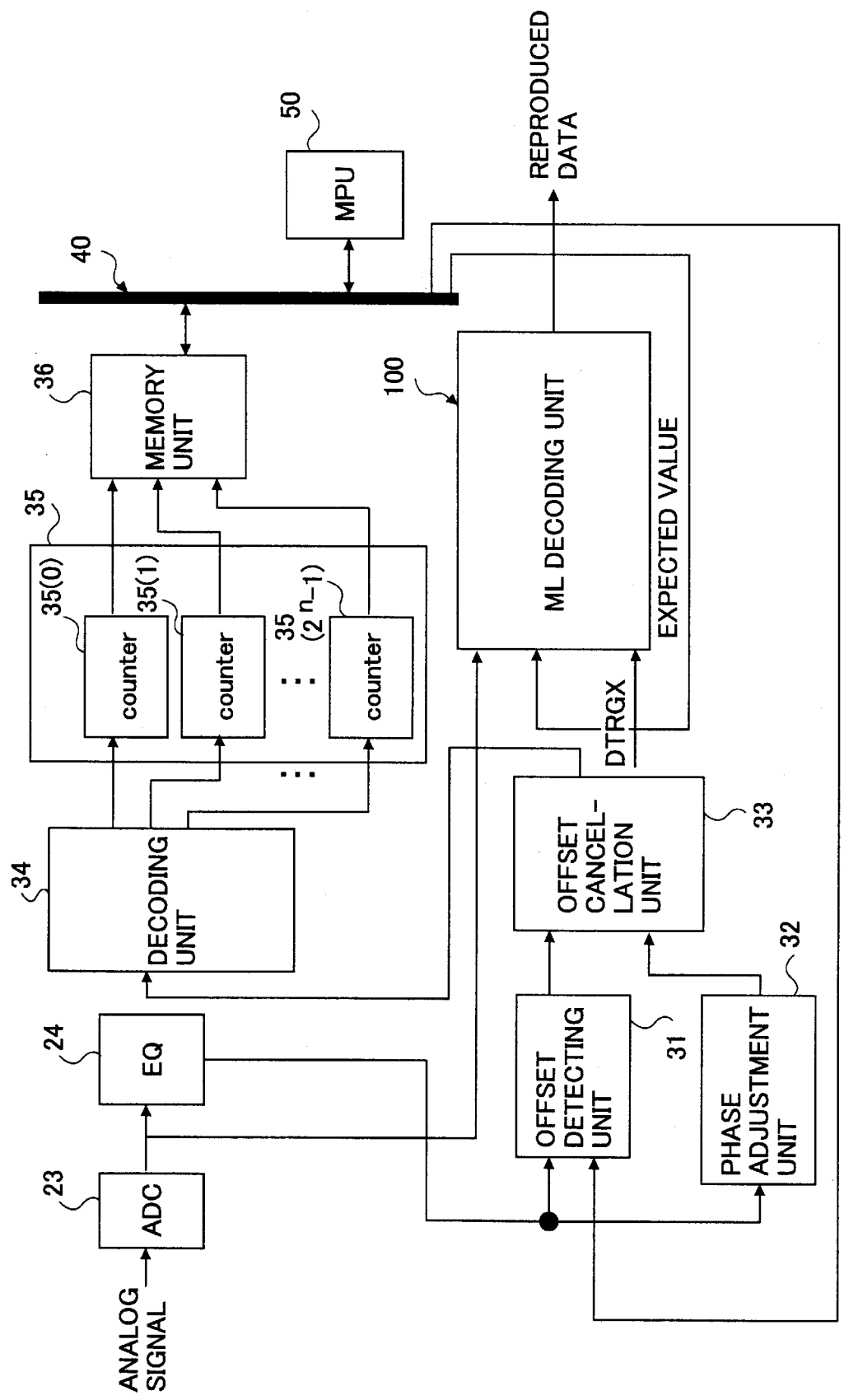
FIG. 5 is a block diagram showing a configuration example of a data reproduction apparatus of a first embodiment of the present invention.

The data reproduction apparatus of a first embodiment of the present invention is configured as shown in FIG. 5, wherein the "Analog signal" is a signal that is output from the LPF 22 in FIG. 1.

The data reproduction apparatus of FIG. 5 includes an ADC 23 that receives the analog signal supplied from the optical head 20 via the LPF 22 that are shown in FIG. 1, and outputs sampled values (quantization data) in synchronization with a given clock, an EQ 24 that performs digital equalization processing of a PR wave to the sampled values, and an ML decoding unit 100 that reproduces data by applying a predetermined maximum likelihood decoding (for example, Viterbi decoding) algorithm to the sampled values from the ADC 23.

The data reproduction apparatus further includes an offset detecting unit 31, a phase adjustment unit 32, an offset cancellation unit 33, a decoding unit 34, a counter unit 35, and a memory unit 36. The offset detecting unit 31 detects an offset amount of a signal to be reproduced based on the sampled values from the ADC 23. The phase adjustment unit 32 receives waveform-equalized sampled values from the EQ 24, and adds a delay equivalent to time consumed by a processing of the offset value detecting unit 31, and outputs the sampled values. The offset cancellation unit 33 receives sampled values, phase of which has been matched with the offset amount by the delay added by the phase adjustment unit 32, and a corresponding offset amount.

Then, the offset cancellation unit 33 deducts the offset amount detected by the offset detecting unit 31 from the sampled values supplied from the EQ 24 via the phase adjustment unit 32 as mentioned above, and outputs the processed sampled values to the decoding unit 34. Every time sampled values with the offset removed as above are received from the offset cancellation unit 33, the decoding unit 34 outputs a pulse signal from an output terminal corresponding to the sampled value. Here, the decoding unit 34 includes output terminals corresponding to each of the sampled values expressed by n bits from zero to $2^n-1$ (in the case of six bits, values from zero to 63).

The counter unit 35 includes counters 35($i$), namely 35(0), 35(1), through 35($2^n-1$), each connected to each output terminal of the decoding unit 34. Each of the counters 35(i) counts the number of pulse signals output from each output terminal of the decoder 34 to which each of the counters 35(i) is connected. Therefore, the enumerated data of each counter 35(i) indicates the number of times of an appearance of a corresponding sampled value. The memory unit 36 stores the enumerated data of each of the counters 35(i) of the counter unit 35.

Figure 4:
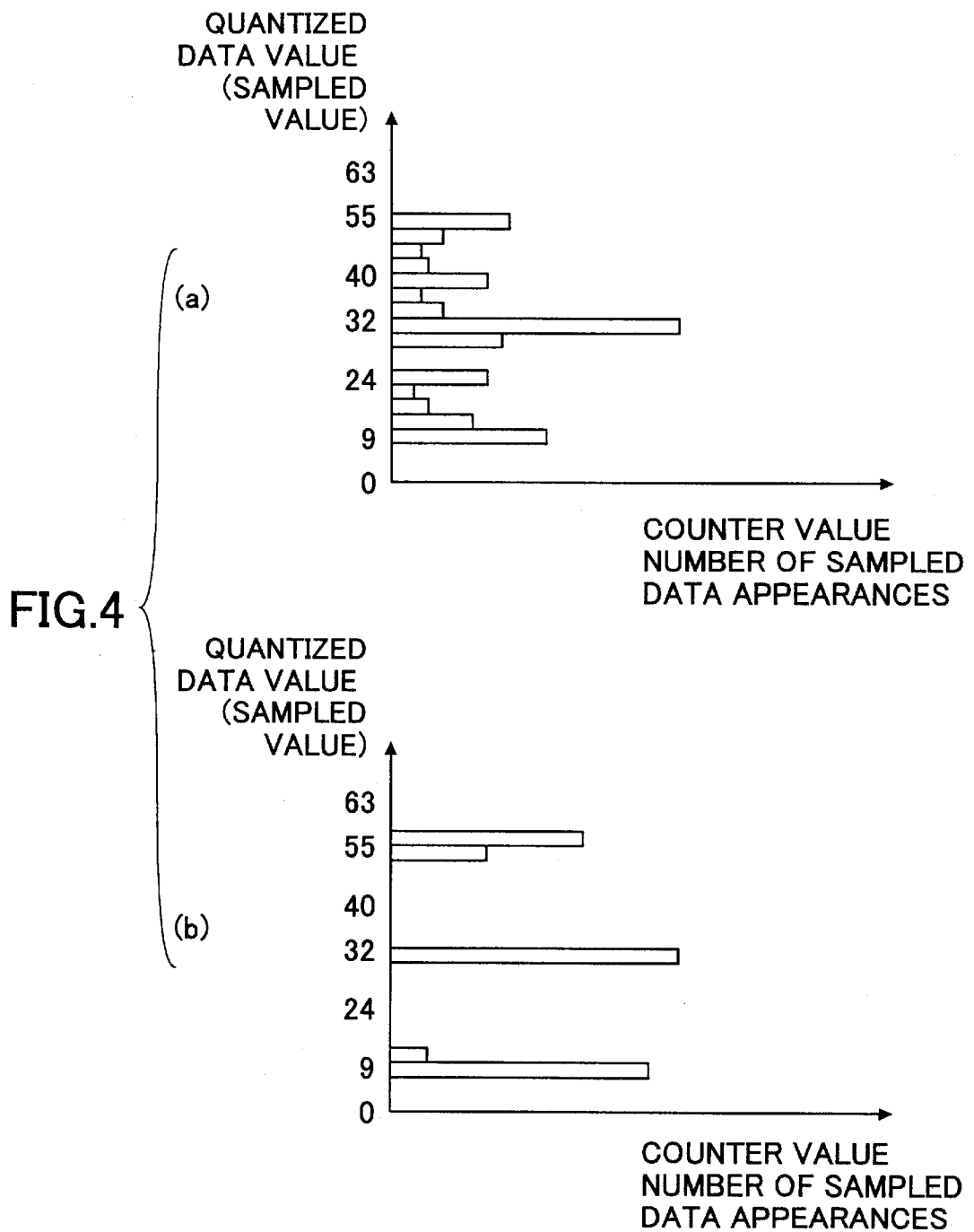
FIG. 4(a) is a figure showing an example of a histogram of sampled values when a reproduction contains an offset.
FIG. 4(b) is a figure showing an example of a histogram of sampled values when a reproduction does not contain an offset.

The data reproduction apparatus further includes a control unit (MPU) 50, to which the offset detecting unit 31, an ML decoding unit 100, and the memory unit 36 are connected through a bus 40. The control unit 50 provides the offset value detecting unit 31 with an average number that should be used for moving-average operation, as described later. Further, the control unit 50 reads the number of times of an appearance of each sampled value stored in the memory unit 36 at a predetermined interval, and generates a histogram (refer to FIG. 4 (b)) showing the distribution of the sampled values. The control unit 50 determines a certain quantity of expected values by selecting the certain quantity of sampled values that are peak values in the histogram. Here, the certain number is dependent on the PR wave form. In the case of PR(11), the number is three. The expected values are supplied to the ML decoding unit 100.

The ML decoding unit 100 reproduces data according to a predetermined maximum likelihood decoding algorithm using the sampled values from the ADC 23, and the expected values from the control unit 50.

The offset detecting unit 31 mentioned above is configured as shown in FIG. 6. The offset detecting unit 31 calculates an offset amount that is the difference between a center value that a signal to be reproduced of the PR wave containing no offset should originally take (henceforth a fixed-center value), and a sampled value at a predetermined edge (a rising edge or a falling edge) of the signal to be reproduced at which the central value should be sampled.

Figure 6:
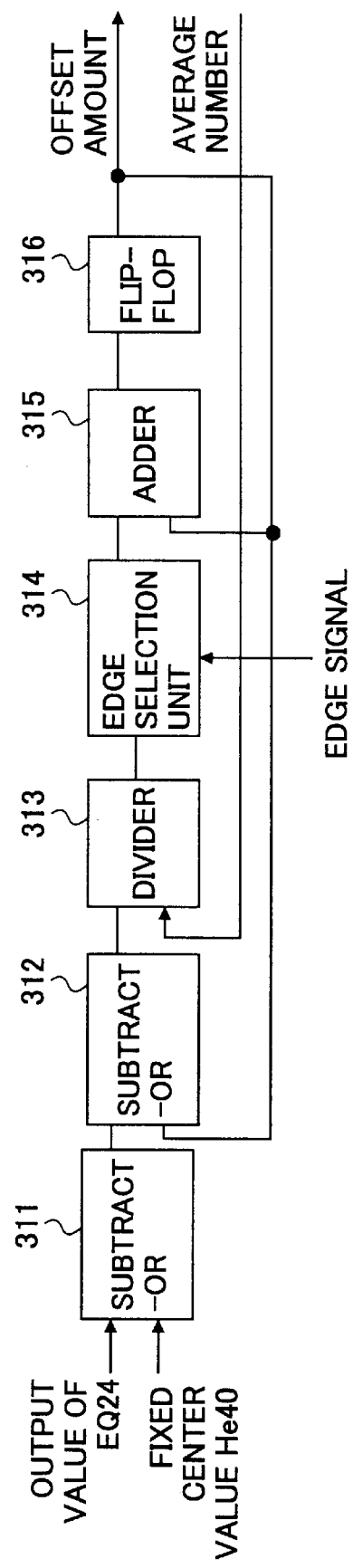
FIG. 6 is a block diagram showing a configuration example of an offset value detecting unit of the present invention.

As shown in FIG. 6, the offset detecting unit 31 includes a subtractor 311, a subtractor 312, a divider 313, an edge selection unit 314, an adder 315, and a flip-flop (FF) 316. The subtractor 311 calculates the difference between the sampled value provided from the EQ 24, and the fixed-center value as an amount of an instant offset. The subtractor 312 calculates the difference between the amount of the instant offset obtained by the subtractor 311, and an offset amount (moving average) obtained last time and stored in the flip-flop 316. The divider 313 divides the difference obtained by the subtractor 312 by the average number supplied from the control unit 50, such that an average difference at the average number (henceforth, divided difference value) is calculated.

The edge selection unit 314 supplies the divided difference value obtained from the divider 313 to the adder 315, when an edge signal synchronized with the predetermined edge (a rising edge or a falling edge) of the signal to be reproduced obtained by processing of the synchronous clock generation unit 25 is valid. Namely, the divided difference value calculated based on the sampled value acquired at the predetermined edge of the signal to be reproduced is supplied to the adder 315.

The adder 315 adds the divided difference value supplied from the edge selection unit 314 to the offset amount (moving average) calculated the last time and stored in the flip-flop 316, and the sum thereof is output as a new offset amount (moving average). The offset amount output from the adder 315 is stored in the flip-flop 316.

By the above configuration, the offset detecting unit 31 outputs the moving average of the instant offset amounts, each of the amounts being the difference between the sampled value obtained at the predetermined edge of a signal to be reproduced and the fixed average.

Here, the average number for calculating the moving average is set up by the control unit 50 arbitrarily. If the average number is made the larger, the divided difference value becomes the smaller, and an influence that one sampled value has on a moving average becomes the smaller. That is, a response to change of a signal to be reproduced becomes the poorer. Conversely, if the average number is made the smaller, the divided difference value becomes the larger, and the influence that one sampled value has on a moving average becomes the larger. That is, the response to change of a signal to be reproduced becomes the faster.

Figure 7:
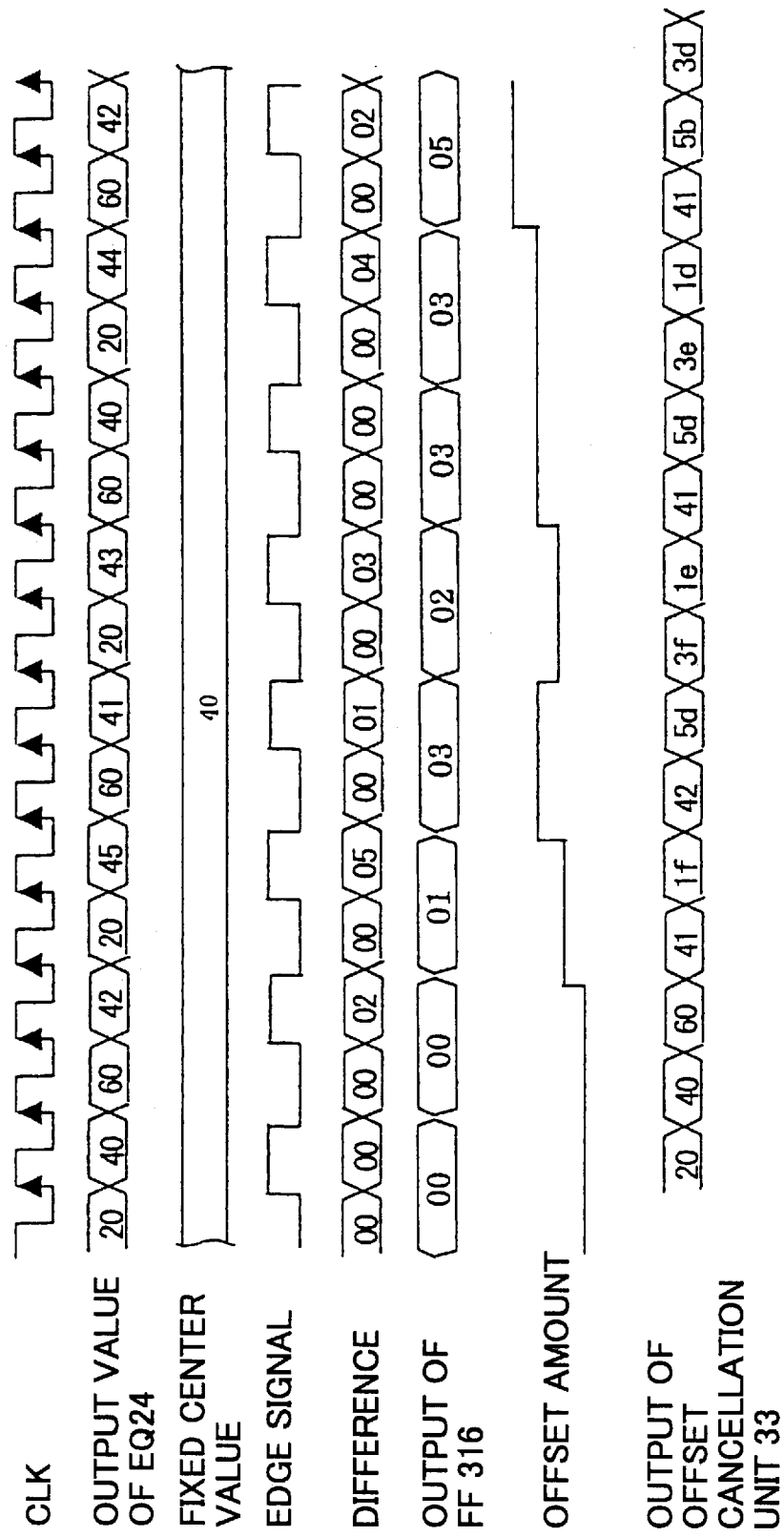
FIG. 7 is a timing chart showing an example of signals (data transition) at various units, relative to offset cancellation operation.

The offset detecting unit 31 operates like a timing chart shown in FIG. 7. Each value is expressed in the hexadecimal in FIG. 7.

The sampled value from the EQ 24 synchronizes with a predetermined clock CLK in FIG. 7, and changes like "20", "40", "60", "42", "20", "45", "60" (HEX), and so on. Differences between the sampled values and the fixed-center value, "40" in this example, are acquired whenever an edge signal becomes effective, which are -"02"-"05"-"01"-"03"-"04"-"02". Accordingly, the moving averages "00", "00", "01", "03", "02", "03", "03", "05" (HEX) and so on are obtained as offset amounts (outputs of the flip-flop 316). Consequently, the offset amounts are deducted from the corresponding sampled values, and the sampled values from which the offset amounts are deducted are obtained (outputs of the offset cancellation unit 33) like "20", "40", "60", "41", "1f", "42", "5d" (HEX) and so on.

The histogram is generated from the number of times of an appearance of a sampled value from which an offset amount is removed. FIG. 4(a) demonstrates the case where a large variation is present in the sampled values acquired from the signal to be reproduced, due to the offset. FIG. 4(b) shows the case where the offset is removed, demonstrating clear peaks. Expected values to be used in the ML decoding unit 100 are determined from the histogram of the sampled values having clear peak values, thereby expected values that are more accurate can be obtained.

The ML decoding unit 100 starts decoding data, when a reproduction start signal DTRGX, serving as a trigger, is received. In the decoding process, the offset amount of the signal is removed by the same technique as above from the sampled values supplied from the ADC 23 in synchronization with the given clock signal. Then, the data are reproduced using the sampled values from which the offset is removed and the expected value supplied from the control unit 50 as mentioned above, and according to the predetermined maximum likelihood decoding algorithm (for example, Viterbi decoding algorithm).

Sometimes, a magneto optical disk 200 stores peculiar data that generate a sudden change in the offset amount of the signal to be reproduced. The peculiar data are typically a Resync byte, and the like, which is recorded to minimize the difference of DSV (direct-current-offset value) between contiguous data blocks in a sector. During a period while the offset amount of a signal to be reproduced is expected to change rapidly, stability of detection of the offset amount may be deteriorated. For this reason, sampled values obtained during the period where the offset amount of the signal to be reproduced is expected to change rapidly are removed from the object of the histogram. The data reproduction apparatus that realizes such processing can be configured as shown in FIG. 8.

Figure 8:
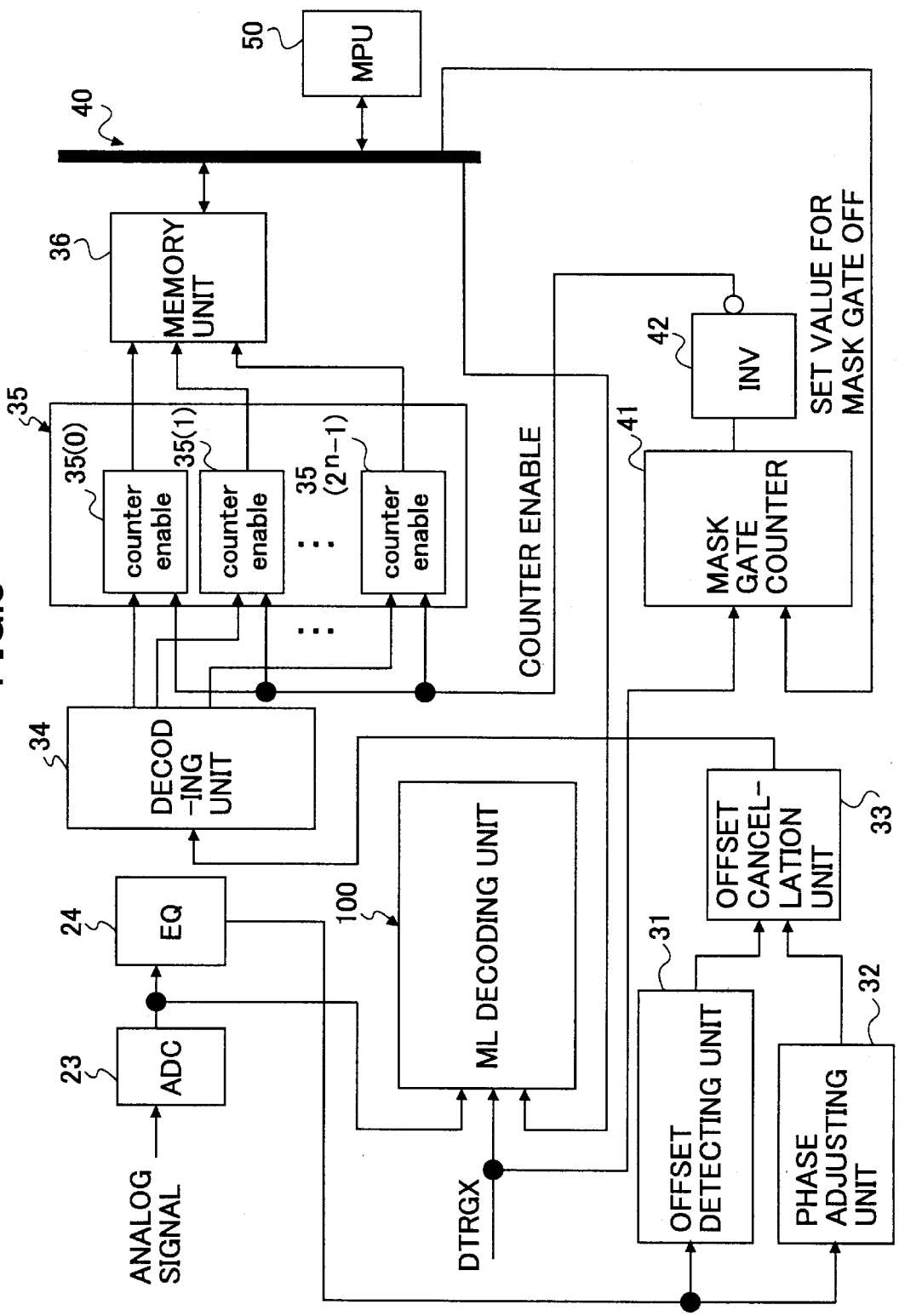
FIG. 8 is a block diagram showing a configuration example of the data reproduction apparatus of a second embodiment of the present invention.

In FIG. 8, the same reference signs are attached to the same units as FIG. 5.

The data reproduction apparatus shown in FIG. 8 includes the ADC 23, the EQ 24, the offset detecting unit 31, the phase adjustment unit 32, the offset cancellation unit 33, the decoding unit 34, the counter unit 35 equipped with counters 35(0) through $35(2^n-1)$, the memory unit 36, the control unit 50, and ML decoding unit 100, like the example shown in FIG. 5. This data reproduction apparatus further includes a mask gate counter 41, and an inverter unit 42.

The mask gate counter 41 receives the reproduction start signal DTRGX, and a set value for mask gate-off supplied from the control unit 50 via the bus 40, and outputs a mask gate signal.

The mask gate counter 41 outputs a mask gate enable signal (e.g. high level) for a period T1, when counted value reaches the set value for the mask gate-off from the timing of input of the reproduction start signal DTRGX. The set value for mask gate-off corresponds to a period from a data start that is dependent on a data format to immediately before the Resync byte begins. Where there are two or more Resync bytes in a data area, the set value for the mask gate-off is provided to each Resync byte.

The inverter unit 42 reverses the mask gate signal supplied from the mask gate counter 41, and generates a counter enable signal. The counter enable signal is provided to each of the counters 35(0) through $35(2^n-1)$ of the counter unit 35. Each of the counters 35(0) through $35(2^n-1)$ stops counting, when the counter enable signal is not effective, i.e., when the mask gate signal is effective.

In the data reproduction apparatus, when the offset amount of a signal to be reproduced changes rapidly corresponding to the Resync byte, as shown by (a) in FIG. 9, the mask gate signal starts immediately before the period corresponding to the Resync byte, as shown by (b) in FIG. 9, and the mask gate signal falls after the time T1. The counter enable signal is an inverse of the mask gate signal, as shown by (c) in FIG. 9.

In this manner, each of the counters 35(0) through $35(2^n-1)$ stops counting from immediately before the offset amount of a signal to be reproduced changes suddenly due to the Resync byte, and resumes the counting operation after the time T1. Therefore, the sampled values during the period while the offset amount of a signal to be reproduced is expected to changes suddenly are not considered as the object of the histogram to be generated. Consequently, an accurate histogram is generated.

In addition, the falling timing of the mask gate signal, i.e., the rising timing of the counter enable signal does not have to be highly accurate. While the predetermined period T1 is set, in principle, based on a period of the Resync byte in a signal to be reproduced, no exact matching is required. Further, this predetermined period T1 can also be variously changed according to a state of the histogram generated.

Further, the period during which the offset amount of a signal to be reproduced is expected to change suddenly is not restricted to the period of the Resync byte. The same processing can be prepared such that a sudden change from other causes shall not influence making the histogram.

Further, the ML decoding unit 100 may be provided with sampled values after the waveform-equalization by the EQ 24, or alternatively, the sampled values after removing an offset may be supplied from the cancellation unit 33 to the ML decoding unit 100.

As explained above, according to the present invention, the expected value generation unit can generate expected values correctly from the histogram of the sampled values of the signal to be reproduced, even though an offset arises in the signal to be reproduced, since the peaks corresponding to the original signal wave comes to arise at the histogram generated from the sampled values from which the offset amount is removed.

Further, according to the present invention, a data reproduction apparatus is realized by using the expected value generation unit described above.

Further, the present invention is not limited to these embodiments, but various variations and modifications may be made without departing from the scope of the present invention.

The present application is based on Japanese priority application No. 2001-383714 filed on Dec. 17, 2001 with the Japanese Patent Office, the entire contents of that are hereby incorporated by reference.

What is claimed is:

1. An expected value generation unit used by a data reproduction apparatus that samples a signal to be reproduced from a recording medium at a predetermined cycle, and performs a probable reproduction of data according to a maximum likelihood decoding algorithm from a relation between a sampled value and an expected value based on a property of a partial response, comprising:

an offset detection unit that detects an offset amount of the signal to be reproduced, an offset cancellation unit that removes the offset amount detected by the offset detection unit from sampled values of the signal to be reproduced, and a histogram generation unit that generates a histogram of the sampled values from which the offset amount is removed by the offset cancellation unit, whereby an expected value is determined.

2. The expected value generation unit as claimed in claim 1, further comprising:

a mask gate counter that detects a period during which the offset amount of the signal to be reproduced is expected to change suddenly, and a control unit that removes sampled values obtained during the period while the offset amount of the signal to be reproduced is expected to change suddenly, such that the sampled values during the period are not used in generating the histogram.

3. A data reproduction apparatus that samples a signal to be reproduced from a recording medium at a predetermined cycle, and performs a probable reproduction of data according to a maximum likelihood decoding algorithm from a relation between a sampled value and an expected value based on a property of a partial response, comprising an expected value generating unit that generates an expected value based on the signal to be reproduced, wherein the expected value generating unit comprises:

an offset detection unit that detects an offset amount of the signal to be reproduced, an offset cancellation unit that removes the offset amount detected by the offset detection unit from sampled values of the signal to be reproduced, and a histogram generation unit that generates a histogram of the sampled values from which the offset amount is removed by the offset cancellation unit, whereby an expected value is determined.

4. In a data reproduction apparatus as claimed in claim 3, wherein the expected value generation unit further comprises:

a mask gate counter that detects a period during which the offset amount of the signal to be reproduced is expected to change suddenly, and a control unit that removes sampled values obtained during the period while the offset amount of the signal to be reproduced is expected to change suddenly, such that the sampled values during the period are not used in generating a histogram.

* * * * *